Patented Feb. 6, 1940

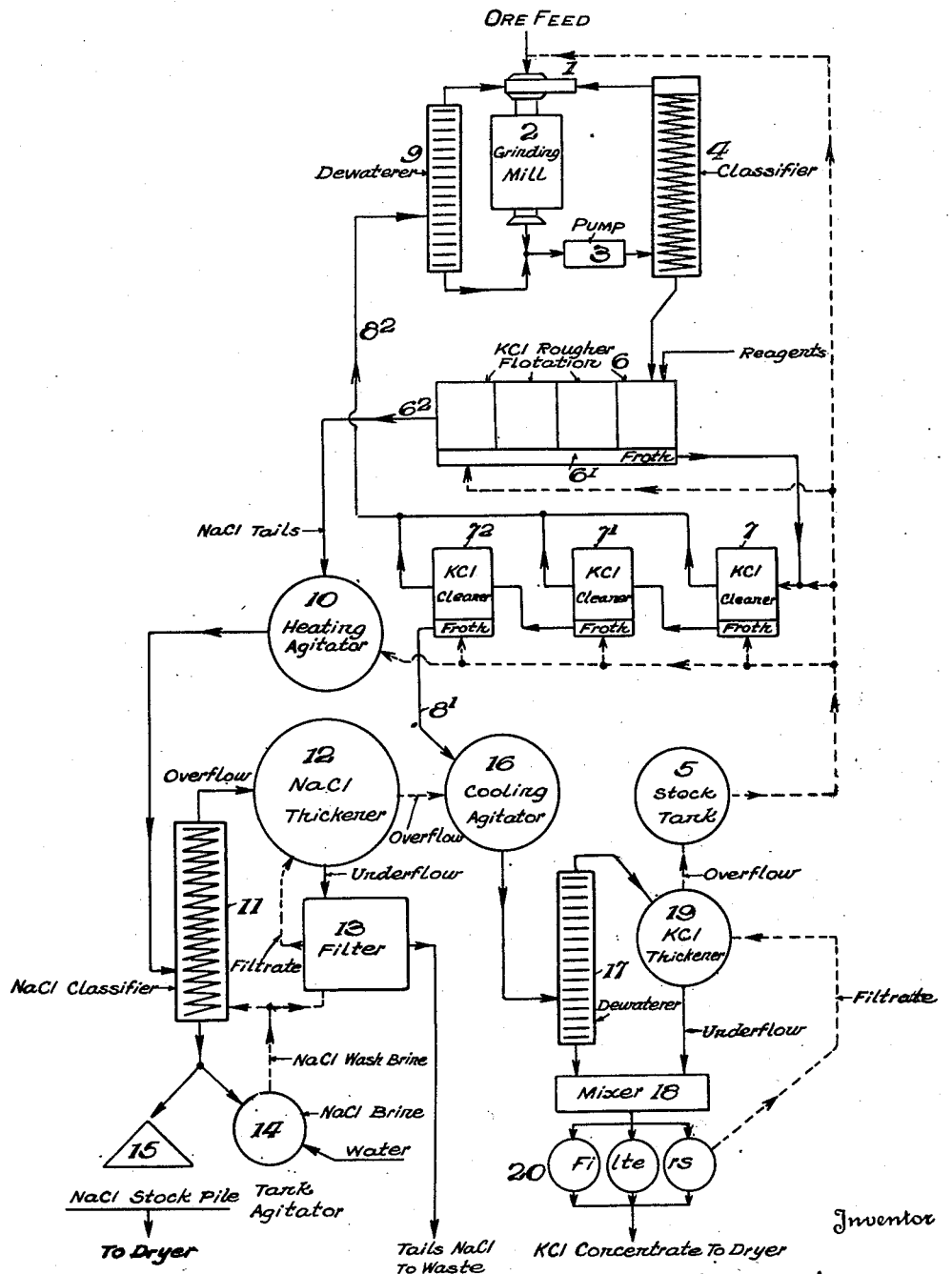

2,188,932

UNITED STATES PATENT OFFICE 2,188,932

FLOTATION PROCESS FOR SYLVINITE ORES

Arthur J. Weinig, Golden, Colo., assignor to Potash Company of America, Denver, Colo., a corporation of Colorado Application August 28, 1935, Serial No. 38,316

15 Claims. (Cl. 83—94)

This invention relates to a process for treating sylvinite ores, which are composed essentially of naturally crystallized potassium chloride and sodium chloride together with clays and other gangue minerals, and to the product or products obtained by such process, and has for its object to provide a new and useful process for separating and recovering from such ores potassium chloride and/or sodium chloride either in a nearly pure form or with desired contents of other minerals while preserving the characteristics of the natural crystals. In such sylvinite ores, the naturally crystallized potassium chloride and sodium chloride appear in a large part as masses of potassium chloride crystals and sodium chloride crystals, and also associated with said masses of crystals are other crystals of potassium chloride and sodium chloride intimately associated together, the natural potassium chloride crystals containing as inclusions various amounts of iron and manganese oxides and other minerals. One of the objects of the present invention is to separate the matter in the intimately associated crystals as such from the larger mass of crystals of potassium chloride and sodium chloride for use, if desired, as a commercial product.

Generally stated, the invention comprises embodying a process of ore froth flotation with a crystallization process, whereby the new result of obtaining the minerals separately in their natural state of crystallization is achieved.

More specifically, the process consists in providing a saturated water solution of the ore at a selected temperature (say room temperature), grinding the ore and mixing it with said saturated solution. In said solution, as long as the temperature remains constant, the potassium chloride and sodium chloride of the ore will not be further dissolved. This mixture of the saturated water solution and the ground ore will be referred to as "the pulp", and the saturated solution will be referred to as "the solution". This pulp is then subjected to a froth flotation process in any suitable flotation machine, using as the flotation reagent an alkali salt of a sulfated alcohol, or more specifically an alkali salt of a sulfated aliphatic alcohol having from 5 to 14 carbon atoms in the molecule, or still more specifically, sodium lauryl sulfate or sodium octyl sulfate. These reagents when used in the amount of from $\frac{1}{10}$ pound to 10 pounds per ton of the ore, serve to produce in the flotation machine a froth and such surface reaction with the potassium chloride as to cause the potassium chloride with its natural coloring matter (iron and manganese oxides) to collect in the froth and the potassium chloride is thereby separated by removal of the froth. In this flotation operation gangue matter, which includes magnesium and aluminum oxides combined as hydrous silicates, is also caused to float while sodium chloride remains in the pulp and is removed from the flotation machine with the pulp as a tailing product. The process with all its detail steps will be better understood by consideration of the following example and reference to the attached flow sheet, but it will be understood that the limits of the invention are not confined to the specific example and the particular arrangements indicated by such flow sheet, the same being employed for purposes of illustration only and not for the purpose of defining the limits of the invention, reference being had to the appended claims for this purpose.

Referring to the flow sheet, the ore is supplied to any suitable feeder 1 which delivers it to a suitable grinding mill 2. In this mill the ore may be ground either in a dry state or may be ground in the presence of water or, preferably and as here shown, ground in the presence of a solution of the ore obtained from stock tank 5 and which is supplied to the feeder 1 together with the ore. After grinding with the solution in the grinding mill, the ore is delivered by a pump 3 to a classifier 4, wherein the particles of ore of suitable size are overflowed into the flotation machine 6, while the larger particles are returned to the grinding mill by way of the feeder 1 for re-grinding.

The overflow from the classifier 4 is a pulp consisting usually of from one to five parts solution to one part of ore by weight, and as indicated above, is delivered to the flotation machine 6, which generally, and as here shown, consists of a plurality of cells. The reagents are added to the pulp in the flotation machine 6 and cause the formation of froth carrying potassium chloride, iron and manganese oxides, and gangue matter of near colloidal size containing magnesium and aluminum oxides combined as hydrous silicates. This froth overflows into the froth launderer 6', while the sodium chloride escapes as a tailing product by way of the tailing discharge 6². In the flotation machine 6, which is the initial flotation, the pulp is subjected to a rougher flotation, with the result that neither of the products is secured of a desired purity, partly because of imperfection in the flotation operation and partly because of particles of potassium chloride which have not been ground free of sodium chloride, otherwise known in the art as attached middlings, and are hereinafter referred to simply as "middlings". These being the conditions, it is necessary to further treat each of the products. Accordingly, the froth product from the flotation machine 6 is again treated in one or more flotation cells 7—7'—7², here shown as arranged in series, which cells are known in the art as re-cleaning cells. The froth from the flotation machine 6 is delivered to the cell 7, and as delivered thereto is not a sufficiently pure potassium chloride froth and hence is subjected to a second flotation action in the cell 7. The froth from said cell 7 is delivered to the cell 7' in a somewhat purer condition than when received from the rougher flotation machine 6. In the cell 7' this partially pure potassium chloride froth is subjected to a further flotation action, and the froth therefrom (and of a still higher grade) is delivered to the flotation cell 7² in which it is subjected to a still further flotation action. The froth from said cell 7² is passed onward by way of a conduit 8' for further treatment as will be hereinafter described.

The tailings from the several cleaner flotation cells 7, 7' and 7² may be reclaimed for sale purposes as an intermediate grade product, or if preferred, may be passed, as indicated, by way of the flow conduit 8² to a dewaterer 9, from which the solid particles are delivered to the feeder 1 and thence to the grinding mill for re-grinding, while the overflow solution passes by way of the pump 3 to the classifier 4.

Since in the initial or rougher potassium chloride flotation in the flotation machine 6 the sodium chloride which discharges therefrom as a tailing pulp is not perfectly free from potassium chloride, further treatment of said tailing pulp is required to effect this result. Accordingly, this sodium chloride tailing pulp is delivered via the conduit 6² to the container 10 wherein the pulp is agitated and heat is applied to raise the temperature to approximately 100–110° F. Any suitable means may be employed for effecting this increase in temperature. For example, when a Diesel engine is employed as a source of power in the plant the hot jacket water from the engine may be circulated through coils in the heating chamber 10, thus effecting the heating of the pulp and at the same time lowering the temperature of the water which may be returned again to the engines and act as a cooling medium therefor.

It has been found that under the influence of increased temperature, with agitation and proper dilution of the solution and the sodium chloride tailings, the potassium chloride passes into solution while the solubility of the sodium chloride is decreased, with the result that some sodium chloride passes out of solution. After treatment for the proper time in the heating chamber 10, the pulp is overflowed while still warm into the sodium chloride classifier 11 wherein granular sodium chloride settles out as a sand product. This sand product is given a back wash of sodium chloride brine (preferably a saturated brine) to free it of solution containing potassium chloride and is delivered to the stock pile 15 where, after drying, it is available for market.

The classifier 11 overflow passes to thickener 12 wherein the slimes and gangue settle out as a pulp which is discharged to filter 13 wherein it is filtered and washed free of solution containing potassium chloride and then discharged as a waste or reject tailing substantially free of potassium chloride. In this filter operation, the wash solution used is substantially pure and preferably saturated sodium chloride brine made up in agitator 14 by adding and agitating water with a portion of the sodium chloride discharge from classifier 11. This brine also serves as a back wash for classifier 11.

It has been found that when solid undissolved particles of potassium chloride are added to a saturated solution of the ore and the temperature of the pulp reduced, potassium chloride particles act as seed upon which dissolved potassium chloride crystallizes out of the solution. Accordingly, the potassium chloride froth from the re-cleaning cells 7² which carries a large amount of solid undissolved particles of potassium chloride is delivered to the cooling agitator 16 via the conduit 8' while the warm solution from the sodium chloride thickener 12 likewise overflows into the cooling agitator 16. Under the influence of the cooling operation in this cooling agitator 16 the excess of dissolved potassium chloride in the overflow from the thickener 12 crystallizes out upon the grains or particles of potassium chloride in the froth, and the cooled solution is restored to its normal dissolved potassium chloride content for the temperature at which it is cooled, that is the normal mill pulp temperature. Since the froth also contains fine particles of magnesium and aluminum hydrous silicates, the new crystals of potassium chloride which are built up on the solid undissolved particles thereof under the influence of the cooling operation will contain the magnesium and aluminum minerals as inclusions. It seems that the growth of the potassium chloride crystals clarifies out of solution the magnesium and aluminum minerals and causes the latter to enter the concentrate.

When this cooling operation is complete, the cooled pulp is overflowed to a dewaterer 17 wherein the coarser grains of potassium chloride settle out and are delivered as a dewatered thickened pulp to the mixer 18. The overflow solution from the dewaterer 17 and the finer grains of potassium chloride carried thereby is passed to the potassium chloride thickener 19, wherein the grains of potassium chloride are permitted to settle, after which the overflow from the thickener 19, consisting of a solution practically free from solid particles of potassium chloride is passed to the stock tank 5, from which the solution may be passed to the various points in the mill circuit for re-use. The thickened potassium chloride pulp from the thickener 19 is delivered by an under flow to the mixer 18 and is there mixed with the potassium chloride particles received in the mixer from the dewaterer 17. This combined pulp is then delivered to filters 20, wherein the remaining solution is removed, the filtrate being passed to the potassium chloride thickener 19. In the filters 20, in order to remove the solution containing sodium chloride from the potassium chloride, the latter is washed. This washing may be effected either by the use of water as such, or and preferably, by the use of a saturated solution of potassium chloride. After filtering, the potassium chloride cake is sent to a drier from which the potassium chloride is available for market.

It will be found that the potassium chloride secured as the result of the process herein described is not the ordinary white, chemically refined potassium chloride. On the contrary, it is granular in form and of a pinkish color due to small amounts of iron and manganese oxides contained in the natural crystals of the sylvinite ore which remain with and color the potassium chloride obtained as the product of the present process. It may also contain appreciable amounts of magnesium and aluminum oxides combined as hydrous silicates.

By proper control of the flotation process it is possible to select various grades of potassium chloride particles differing in their amounts of iron, manganese, magnesium and aluminum oxides so as to provide final products of varying degrees of purity. It has also been found that with the present process potassium chloride products containing objectionable matter as inclusions may be dissolved, the insoluble objectionable matter settled out or otherwise removed from the solution, and the soluble potassium chloride recrystallized onto other potassium chloride products, thereby modifying, changing or altering to a considerable degree the amount of foreign matter obtained in the finished product. Likewise, if it is desired that the product contain a certain amount of magnesium or aluminum, the degree of inclusion of these constituents may also be controlled by simply selecting the proper kind and amount of reagents used in the flotation process or by otherwise varying the procedural steps of the method disclosed herein.

What is claimed is:

1. In a process of treating sylvinite ore, the steps of forming a pulp by introducing sylvinite ore in finely divided condition into a saturated solution of the ore, selectively froth floating potassium chloride particles from said pulp under the action of a reagent having an affinity therefor, dissolving any potassium chloride remaining in said pulp after the flotation separation by raising the temperature of the pulp, separating the resulting solid sodium chloride from solution, crystallizing potassium chloride from the resulting solution by subsequently lowering the temperature thereof in the presence of said floated potassium chloride particles, and then washing the said potassium chloride solids free from any solution containing sodium chloride.

2. In a process of treating sylvinite ore, the steps of forming a pulp by introducing sylvinite ore in finely-divided condition into a saturated solution of the ore, selectively froth floating potassium chloride particles from said pulp under the action of a reagent having an affinity therefor, subjecting the sodium chloride tailings of the flotation step to heat and agitation, whereby solid potassium chloride carried by said tailings is dissolved and separating the solid sodium chloride from the solution.

3. In a process of treating sylvinite ore, the steps of forming a pulp by introducing sylvinite ore in finely-divided condition into a saturated solution of the ore, selectively froth floating potassium chloride particles from said pulp under the action of a reagent having an affinity therefor, subjecting the sodium chloride tailings of the flotation step to heat and agitation, whereby potassium chloride carried by said tailings is dissolved, separating the sodium chloride from the solution, and washing the said separated sodium chloride.

4. In a process of treating sylvinite ore, the step of grinding the ore in a solution of the ore, forming a pulp by introducing such ground ore into a saturated solution of the ore, selectively froth floating potassium chloride particles from said pulp by the action of a reagent having an affinity therefor, raising the temperature of the tailings removed from said flotation separation, whereby potassium chloride remaining in said tailings is dissolved and some sodium chloride is precipitated out of solution, separating sodium chloride solids from the solution, and then lowering the temperature of the solution so separated in the presence of potassium chloride particles to induce crystallization of potassium chloride from such solution.

5. A process of treating sylvinite ores, which comprises introducing sylvinite ore in finely-divided condition into a saturated solution of the ore to form a pulp, subjecting undissolved potassium chloride particles in the pulp to the action of a froth flotation reagent having a selective affinity therefor, removing the resulting froth carrying potassium chloride, reducing the temperature of the froth product so removed to cause sodium chloride solids to enter into solution and potassium chloride solids to deposit out of solution, and finally separating the undissolved potassium chloride from such solution.

6. In a process of treating sylvinite ores, the improvement which comprises subjecting such ores in a saturated solution of the ore at a substantially uniform temperature to a froth flotation treatment in the presence of a reagent having a selective affinity for potassium chloride, and finally reducing the temperature of the potassium chloride froth concentrate to crystallize potassium chloride from the associated solution and cause sodium chloride solids therein to enter into solution.

7. In a cyclic process of treating sylvinite ores, the improvement which comprises subjecting such ores in a saturated solution of the ore at a substantially uniform temperature to a froth flotation treatment in the presence of a reagent having a selective affinity for potassium chloride, reducing the temperature of such froth concentrate to crystallize potassium chloride from the associated solution and cause sodium chloride solids in the concentrate to enter into solution, separating the solids from the solution after cooling, and returning the cooled solution so separated to the flotation stage of the operation.

8. In a process of treating sylvinite ores, the improvement which comprises subjecting such ores in a saturated solution of the ore to a froth flotation treatment in the presence of a reagent having a selective affinity for potassium chloride, heating the residue of the flotation treatment to dissolve potassium chloride solids and cause sodium chloride of the associated solution to deposit out of solution, separating the solids from the resulting solution, reducing the temperature of the froth concentrate to crystallize potassium chloride and dissolve sodium chloride solids therein, and introducing the warm solution from the first mentioned separation into the froth concentrate for reduction in temperature therewith.

9. In a process of treating sylvinite ores, the improvement which comprises subjecting such ores in a saturated solution of the ore to a froth flotation treatment in the presence of a reagent having a selective affinity for potassium chloride, heating the residue of the flotation treatment to dissolve potassium chloride solids and cause sodium chloride therein to deposit out of solution, separating the solids from the solution, reducing the temperature of such froth concentrate to crystallize potassium chloride and dissolve sodium chloride solids in the concentrate, introducing the warm solution from the first mentioned separation into the froth concentrate for reduction in temperature therewith, separating solids from the solution after cooling, and returning the cooled solution so separated to the flotation treatment.

10. In a process of treating sylvinite ores, the steps of introducing sylvinite ore in finely-divided condition into a saturated solution of the ore to form a pulp, removing a substantial part of the potassium chloride from the pulp in an initial froth flotation treatment in the presence of a reagent having a selective affinity for potassium chloride, mixing the froth concentrate of the initial flotation with a saturated potassium chloride-sodium chloride solution at a lower temperature than the initial froth concentrate to increase the potassium chloride solids content thereof, and separating a purified potassium chloride product from a constituent middlings product in the resultant mixture by a second froth flotation treatment in the presence of a reagent having a selective affinity for potassium chloride.

11. A process for the recovery of valuable constituents of sylvinite ore, which comprises introducing sylvinite ore in finely-divided condition into a saturated solution of the ore to form a pulp, subjecting the pulp to a froth flotation treatment to selectively float potassium chloride, reducing the temperature of the froth product to induce crystallization of potassium chloride and to cause sodium chloride to enter into solution, increasing the temperature of the residual solids of flotation to cause potassium chloride to enter into solution and cause sodium chloride to deposit in solid form, separating the solids from such solution at the completion of the temperature increase, mixing the solution so separated with the froth product while reducing its temperature, separating the solids from the solution at the completion of such temperature reduction, and washing the solids so separated with a saturated solution of potassium chloride to remove any adhering sodium chloride therefrom.

12. A process for the recovery of valuable constituents of sylvinite ore, which comprises introducing sylvinite ore in finely-divided condition into a saturated solution of the ore to form a pulp, subjecting the pulp to a froth flotation treatment to selectively float potassium chloride, reducing the temperature of the froth product to induce crystallization of potassium chloride and to cause sodium chloride to enter into solution, increasing the temperature of the residual solids of flotation to cause potassium chloride to enter into solution and cause sodium chloride to deposit in solid form, separating the solids from such solution at the completion of the temperature increase, mixing the solution so separated with the froth product while reducing its temperature, separating the solids from the solution at the completion of such temperature reduction, and washing the solids so separated to remove any adhering sodium chloride therefrom.

13. In a process of treating sylvinite ore, the steps of forming a pulp by introducing sylvinite ore in finely-divided condition into a saturated solution of the ore, separating the normally soluble salts of the ore by selectively froth floating potassium chloride particles from said pulp under the action of a reagent having an affinity therefor, dissolving any potassium chloride remaining in said pulp after the flotation separation by raising the temperature of the pulp, separating the resulting solid sodium chloride from the solution, and crystallizing potassium chloride from the resulting solution by subsequently lowering the temperature thereof in the presence of said floated potassium chloride particles.

14. In a process of treating sylvinite ores, the improvement which comprises subjecting such ore in a saturated solution of the ore to an initial froth flotation treatment in the presence of a reagent having a selective affinity for potassium chloride to separate the normally soluble solids of the pulp, and subsequently treating the froth concentrate of the initial flotation inclusive of the removal of solid sodium chloride remaining therein and treating the residue of the initial flotation separation at a temperature lower than the pulp temperature of the flotation separation for the recovery of the potassium chloride content thereof not collected in the froth of the initial separation and the quantity of potassium chloride in liquid phase in excess of the initial saturation of the solution.

15. In a process of treating sylvinite ores, the improvement which comprises subjecting such ore in a saturated solution of the ore to an initial froth flotation treatment in the presence of a reagent having a selective affinity for potassium chloride to separate the normally soluble solids of the pulp, and subsequently treating the froth concentrate of the initial flotation inclusive of the removal of solid sodium chloride remaining therein and treating the residue of the initial flotation separation at a temperature lower than the pulp temperature of the flotation separation for the recovery of the potassium chloride content thereof not collected in the froth of the initial separation and the quantity of potassium chloride in liquid phase in excess of the initial saturation of the solution in a cyclic operation in which solution separated from the solids of such subsequent treatments is recirculated through the initial flotation separation stage as the temperature regulating medium thereof.

ARTHUR J. WEINIG.